July 29, 1941.  E. F. SMITH ET AL  2,250,729
RECEPTACLE
Filed Aug. 28, 1939  2 Sheets-Sheet 1

INVENTORS
EARL F. SMITH
GUY KENNETH WILSON
ATTORNEY.

July 29, 1941.  E. F. SMITH ET AL  2,250,729
RECEPTACLE
Filed Aug. 28, 1939  2 Sheets-Sheet 2
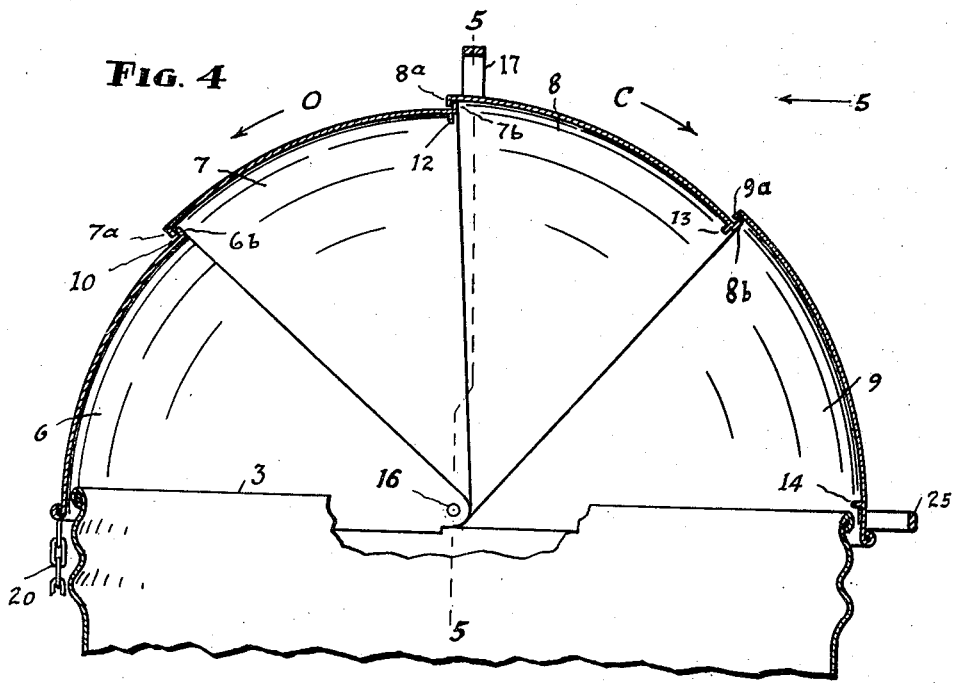
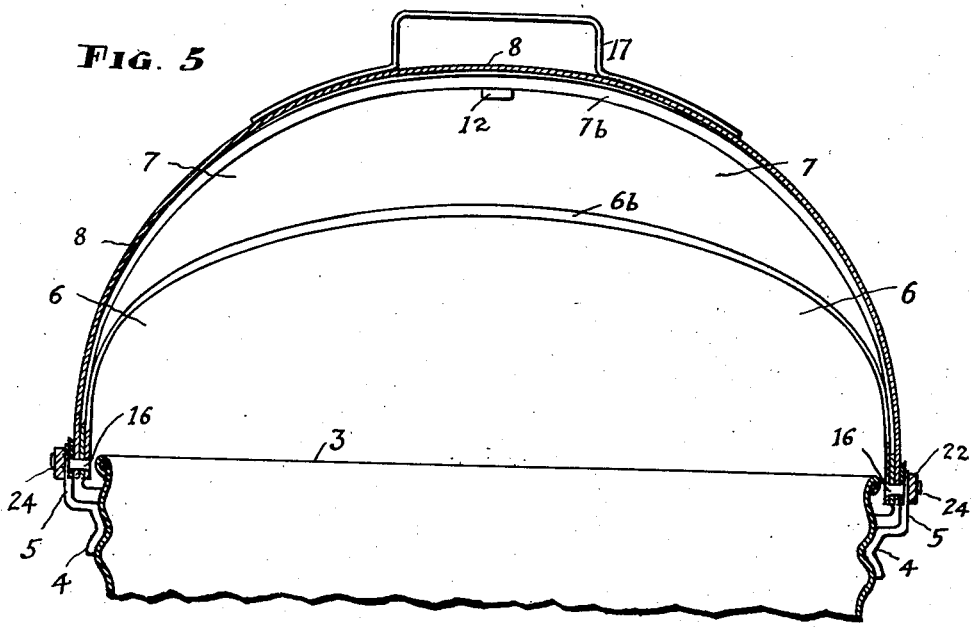
INVENTORS
EARL F. SMITH
GUY KENNETH WILSON
By Thomas E. Ryan
ATTORNEY.

Patented July 29, 1941

2,250,729

UNITED STATES PATENT OFFICE 2,250,729

RECEPTACLE

Earl F. Smith and Guy Kenneth Wilson,
Muncie, Ind.

Application August 28, 1939, Serial No. 292,260

5 Claims. (Cl. 220—38)

This invention relates to improvements in receptacle devices intended for the reception and retention of garbage or the like, such a device as hitherto supplied consisting of a sizable upright cylindrical container provided with an ordinary removable lid.

For obvious reasons, based mainly upon sanitation considerations, the lid of a device of the above description should be continuously in place except at such times as the garbage is being deposited in the container and at such times as the garbage is being removed from the container. Such lid being subject to accidental dislodgement there is necessary the handling and rehandling of the lid if it is to be kept in its place; and if it is not so kept in place the garbage contents are exposed to the elements, and to marauders, and moreover, the same are liable to be disarranged and spilled in event the container should be overturned.

Having in mind the above named disadvantages, and appreciating the fact that for a receptacle of the above description, any arrangement of a lid with conventional hinge-like attachments is impracticable, our invention has proceeded upon the idea of providing, in combination with a container for the purpose set forth, co-related parts constituting a closure that may embody attachments at each side of the mouth of the container; also that said closure shall be easily operable from open position to closed position, and vice versa, and that it may serve as a bail when necessary. Accordingly, the object of our invention is to provide a receptacle device embodying the above features generally, and which will be economical of construction, durable and dependable, and which will lend itself to facility in manufacturing, and in the handling, packing and transportation of same.

The above named general objects, as well as other and more specific aims of our invention as will presently appear, are accomplished by and our invention is embodied in the new construction, combination and arrangement of parts illustrated in the accompanying drawings, and described in the following specification.

The several parts of the invention are identified in the different views in the drawings, by suitable characters of reference applied to them.

In the drawings—

Figure 4 is an enlarged vertical cross section detail view taken on the broken line 4—4 and in the direction of arrow 4 in Figure 2.

Figure 5 is a vertical cross section view taken on the broken line 5—5, and in the direction of arrow 5 in Figure 4.

Figure 2:
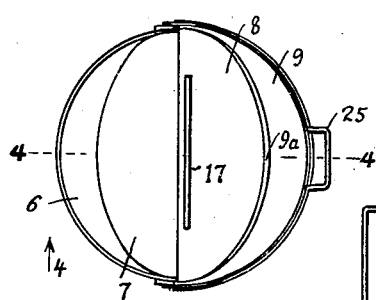
Figure 2 is a top plan view taken in the direction of arrow 2 in Figure 1.

By the word "receptacle" is meant the container in which the garbage is received, and the closure combined therewith and by which the mouth of the container is covered. For convenience in clearly describing our invention, the portion of the receptacle which faces the letter F in the drawings (see Figure 1), may be considered as the front of the receptacle.

Figure 7:
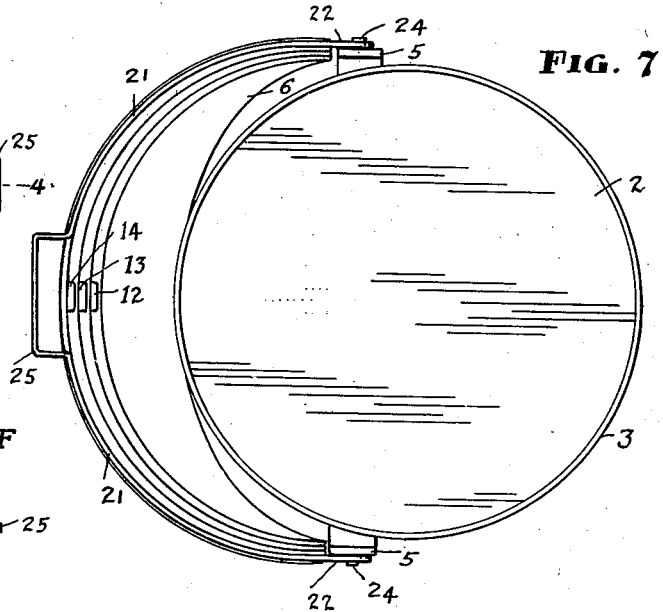
Figure 7 is a top plan view of Figure 6, taken in the direction of the arrow 7 in Figure 6.

A container of the conventional form as depicted in the drawings, is about fourteen inches in diameter and is made of galvanized sheet metal. It comprises the side walls 1, bottom 2, and the stout annular mouth rim 3. At each of the opposite sides of the said mouth rim, and at position offset from the transverse axis of the said mouth rim is secured a metal bracket like fixture which we designate as a cheek piece 4. It is provided with an aperture for the reception of a pivot pin presently to be referred to. These cheek pieces are of such formation that when they are in the secured position, their upright portions 5 are a predetermined distance apart, as indicated in Figure 7.

A closure device, hemispherical in formation, and which may be designated as a collapsible canopy, consists of a plurality of segments, four in the present instance—each made of sheet metal of suitable thickness. They are arranged in overlapping relation and are designated as rear segment 6, intermediate segments 7 and 8, and front segment 9. Their substantially straight side portions are in contiguous side-by-side order as shown in Figures 5 and 7. The embowed body portions of the intermediate segments 9, 8 and 7 embody downwardly disposed lips 9a, 8a, and 7a respectively, at their rearward edges. The embowed body portions of the segments 6, 7, and 8 embody upwardly disposed lips 6b, 7b, and 8b respectively, at their frontal edges, as shown in Figure 4.

Figure 6:
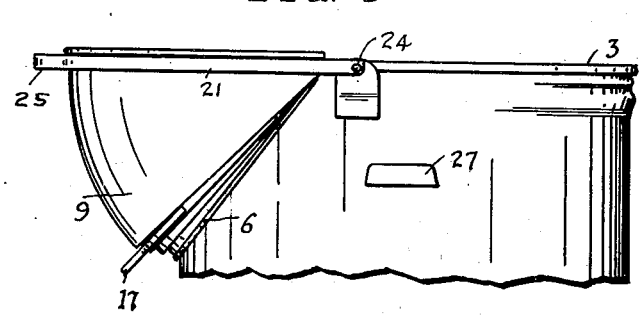
Figure 6 is an enlarged side view of our improved receptacle device as it appears when the closure segments are in the collapsed position and the mouth of the container is uncovered.

These lips are of such depth that a clearance 10 between the embowed portions of the segments is provided, thus assuring free passing of the segments, one over the other; and thus also providing for escapement of air from the interior of the closure. Also the said lips, besides causing the segments to be interengaged with each other, constitute stops which function to limit the distance of travel of the segments, one upon the other, when the front segment 9, carrying as it does, the intermediate segments 8 and 7, and rear segment 6, is being swung from the status as shown in Figure 6, in the direction of arrow C (see Figure 4) to the covering position. The said lips also function to impart to the embowed portions of the segments suitable stiffness to resist any tendency of the segments to become distorted.

At the underside of the frontal edge of the embowed body portion on each of the intermediate segments 7 and 8 and of the front segment 9 are inwardly directed lugs 12, 13, and 14 respectively. They function to limit the distance of travel of the segments, one upon the other, when the said segments are being swung in the direction of arrow 0 (see Figure 4) to the rearward or open position as indicated in Figure 6.

The side portions of the several segments, in their side-by-side contiguous arrangement, as illustrated in Figure 5 and in Figure 7 are interconnected by pivot pins 15 and 16. The bottom or outward edge of the end segment 6, and the bottom or outward edge of the end segment 9 each, is of suitably beaded formation in cross section.

At median position on the rear marginal portion of the intermediate segment 8 is secured a handle 17 which may consist of a length of strip metal humped in its central portion.

A link member 20 has its one end fastened to the outward edge of the rear segment 6, and its other end is secured to the wall of the container. It serves to limit the distance of the travel of the said segment 6 when the several segments are swung in the direction of arrow C.

Integrated with, and embracing the lower marginal portion of the frontal segment 9 is a metal bar 21 whose end portions 22 and 22 extend a predetermined distance beyond the pivotal point of the side portions of said segment. The median portion of said bar is of humped formation to provide a handle 25. This said member 21, combined with the said segment 9, as above described, may be designated as a lever member. Its spaced, oppositely disposed end portions 22 are interconnected pivotally with the cheek pieces 4 and 4, by pivot pins 24 and 24.

Figure 1:
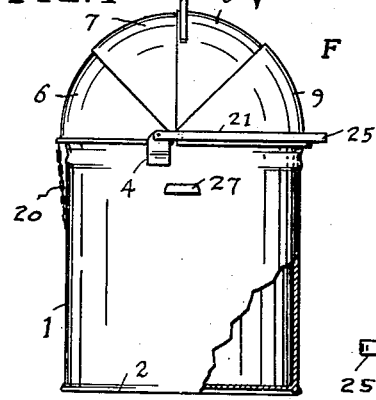
Figure 1 is a side view of our improved receptacle, a portion of the wall of the container being broken away.

Our improved receptacle as supplied to the user appears as in Figure 1, the closure canopy being in the position covering the mouth of the container. It will be observed that in this status the lower marginal portions of the opposite segments 9 and 6 are in alignment at a plane suitably below the plane of the top of the mouth rim of the container.

Figure 3:
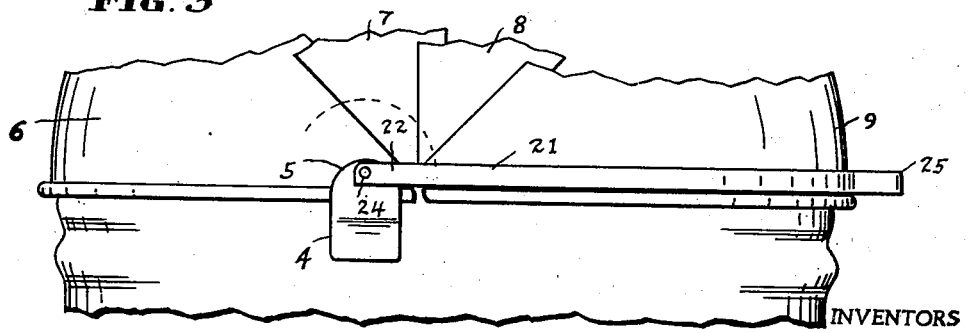
Figure 3 is a detached enlarged side view of the lower portions of the closure segments, as they appear in the status as indicated in Figure 1.

Upon raising the handle 25 there is the moving of the segments in the direction of the arrow 0, the lever member 21 swinging on its pivots 24 and 24, the pivot pins 16 and 16 moving through the arc indicated by the broken lines in Figure 3. As the moving of the handle 25 proceeds in the direction of arrow 0, the segments pass, one by the other, the distance of their travel being limited by the lugs 12, 13 and 14. When the handle will have been moved through an arc of one hundred and eighty degrees, the segments will have been brought to the positions as indicated in Figure 6, the edge portion of the rear segment 6 having come to rest against the rear wall of the container. The frontal segment will have come to the position wherein its edge portion is substantially in alignment with the mouth rim of the container, and the mouth of the container will have been completely uncovered.

Whereas the integrating with the end segment 9, of the curvilinear marginal bar 21 is a preferred form of construction, it will be understood that an equivalent of the portions 22 and 22 of said bar would consist of extensions of the side portions of the said segment, and in which event the handle 25 would be of separate arrangement.

For convenience in carrying the receptacle while the closure canopy is in the collapsed status as in Figure 6, an ear 27 is arranged on each of the opposite walls of the container. The handle 17 is provided for convenience in carrying and/or manipulating the receptacle when the closure canopy is in the closed status as in Figure 1. And the handle 25 besides constituting a grip for the purpose of swinging the segments either to the open or to the closed positions as hereinbefore described, serves for the conveniently carrying of the receptacle when the closure canopy is in partially or half open status.

The closure canopy, in the open status, as in Figure 6, being entirely clear of the mouth rim of the container, the latter lends itself to convenience of the user in the depositing, or in the discharging of the contents of the container. Also the receptacle device lends itself to practicable handling in the merchandising of same as it may be nested in quantities and therefore readily packed for safe and economical transportation in commerce.

A moving of the handle 25 from the position indicated in Figure 6, in the direction of arrow C and to the position as shown in Figure 1 and in Figure 3 will have brought the several segments to the closed status, the outward edge of the rear segment 6 (limited in the distance of its travel by the link member or chain 20) being in registration with the rear portion of the container mouth rim. The pivot pin centers 16 and 16 having been carried to a plane slightly below the plane of the fulcrum pivot pins 24 and 24, there is sufficient tension between the several parts to suitably stay the canopy.

Our improved receptacle is especially desirable on account of its being easy to handle, easy to transport, sanitary and weatherproof; also on account of its capability of retaining its contents even though it may be overturned. Presenting no surfaces upon which a marauding animal may get foot hold, the trouble experienced generally in the upsetting of garbage containers is eliminated.

The invention may be embodied in receptacles of various sizes and capacities. Whereas it is herein explained as being especially applicable for use as a garbage container, it will be understood that the invention is applicable for the reception and retention of other materials as may be desired. Also it will be understood that minor modifications and alterations may be made in the several features of our invention without departing from the spirit or principle of the invention or sacrificing any of its advantages.

What we claim as our invention is:

1. A receptacle of the kind described comprising an open container, a closure therefor consisting of cover segments arranged in loosely interengaged overlapping relation and embodying opposed side portions of substantially straight formation, the ends of the contiguous opposed said side portions being pivotally interconnected, collapsible means to limit the distance of upward movement of one of the end segments, brackets integrated with the opposite sides of the container and embodying cheeks that are in position adjacent to the plane and which are offset from the transverse axis of the said mouth rim, extensions integrated with the opposed side portions of the other end segment and which are pivotally engaged with said cheeks, and devices to limit the distance of the travel of the intermediate segments and the last named segment, one upon the other, whereby the marginal portions of the end segments are normally in position surrounding the mouth of the container, and whereby when the last named segment is swung to position collapsing said segments, all of the said segments will have been transposed to position clear of the said mouth rim.

2. A receptacle of the kind described, comprising a container, embowed cover segments arranged in loosely interengaged overlapping relation and embodying opposed side portions of substantially straight formation, the ends of the contiguous opposed said side portions being interconnected pivotally, a shackle to limit the distance of upward movement of one of the end segments, brackets integrated with the opposite sides of the container and embodying fulcrum bearings which are offset from the transverse axis of said mouth rim, extensions integrated with the opposed side portions of the other end segment and which are coengaged with said fulcrum bearings, and means to limit the distance of the travel of the intermediate segments and the last named segment, one upon the other.

3. A receptacle of the kind described, consisting of a container having a mouth rim, a cheek piece secured to each of the opposite sides of said rim at positions offset from the transverse axis of said rim, embowed segments arranged in loosely engaged overlapping relation and their contiguous side portions being pivotally interconnected at their ends, a semicircular band member embracing and fixedly secured to the outward edge and having its end portions projected beyond the pivotal points of one of the end segments, and thence pivotally interconnected with the said cheek pieces, and a shackle interconnecting the outward edge of the other end segment with an adjacent portion of the wall of the container.

4. A receptacle of the kind described, comprising an open container, a closure therefor consisting of embowed cover segments arranged in loosely interengaged overlapping relation the contiguous opposed side portions thereof being pivotally interconnected at their ends and the said closure being of diameter when in expanded status, to surround the mouth rim of the container, a linked shackle to limit the distance of movement of the underlying end segment, brackets integrated with the opposite sides of the container and embodying cheeks that are in position adjacent to the plane and which are offset from the transverse axis of the said mouth rim, a band embodying a humped central portion to constitute a handle and to embrace and which is fixedly secured to the outward edge of the overlying end segment and whose end portions are projected beyond the pivotal points of said segment and are pivotally interconnected with the said cheeks, and inwardly directed lugs provided on the intermediate segments and the overlying end segment to limit the distance of the travel of these segments, one upon the other.

5. A receptacle device of the kind described, consisting of an open container, a closure therefor consisting of embowed cover segments arranged in overlapping relation their contiguous body portions embodying complemental interengaging lips of a depth to provide clearance between said segments, the contiguous opposed side portions of said segments being pivotally interconnected at their ends and the said closure being of diameter when in expanded status to surround the mouth rim of the container, a chain to limit the distance of movement of the underlying end segment, brackets integrated with the opposite sides of the container and embodying cheeks positioned adjacent to the plane and which are offset from the transverse axis of said mouth rim, a band embodying a handle and which is secured to the outward edge of the overlying end segment and whose end portions are projected beyond the pivotal points of said segment and are pivotally interconnected with the said cheeks, inwardly directed lugs provided on the intermediate segments and the overlying end segment to limit the distance of travel of these segments, one upon the other, and a handle integrated with and adjacent to the lipped portion of the intermediate segment that is interengaged with the said overlying end segment.

EARL F. SMITH.
GUY KENNETH WILSON.